US 7,764,581 B2
(12) United States Patent
Park et al.

(10) Patent No.: US 7,764,581 B2
(45) Date of Patent: Jul. 27, 2010

(54) WRITE-ONCE OPTICAL DISC, AND METHOD AND APPARATUS FOR ALLOCATING SPARE AREA ON WRITE-ONCE OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/242,699

(22) Filed: Sep. 30, 2008

(65) Prior Publication Data
US 2009/0028015 A1 Jan. 29, 2009

Related U.S. Application Data

(63) Continuation of application No. 10/670,462, filed on Sep. 26, 2003, now abandoned.

(30) Foreign Application Priority Data

Feb. 17, 2003 (KR) .......................... 10-2003-09895
Apr. 16, 2003 (KR) .......................... 10-2003-23876

(51) Int. Cl.
*G11B 7/00* (2006.01)
(52) U.S. Cl. .................. 369/53.17; 369/47.14
(58) Field of Classification Search ............ None
See application file for complete search history.

(56) References Cited

U.S. PATENT DOCUMENTS

| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,065,388 A | 11/1991 | Roth et al. |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—Van N Chow
(74) *Attorney, Agent, or Firm*—Birch, Stewart, Kolasch & Birch, LLP

(57) ABSTRACT

A write-once type optical disc and a method and apparatus for allocating a spare area on the write-once type optical disc are provided. The method includes allocating a data area on a recording medium of write-once type, and allocating a user data area and at least one spare area within the data area on the recording medium, the at least one spare area having a variable size, wherein a maximum recording capacity of the at least one spare area on the recording medium is less than a maximum recording capacity of at least one variable spare area on a rewritable type optical disc.

15 Claims, 8 Drawing Sheets

U.S. PATENT DOCUMENTS

| | | | |
|---|---|---|---|
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,666,335 A | 9/1997 | Horibe |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,872,750 A | 2/1999 | Satoh |
| 5,878,020 A | 3/1999 | Takahashi et al. |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 * | 11/2002 | Park et al. ............... 369/59.25 |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 * | 4/2003 | Park ....................... 369/53.15 |
| 6,564,345 B1 | 5/2003 | Kim et al. |
| 6,581,167 B1 | 6/2003 | Gotoh et al. |
| 6,606,285 B1 * | 8/2003 | Ijtsma et al. ............... 369/47.1 |
| 6,615,363 B1 | 9/2003 | Fukasawa et al. |
| 6,631,106 B1 * | 10/2003 | Numata et al. ........... 369/53.17 |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 * | 1/2005 | Ueda et al. ................. 386/125 |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0055012 A1 | 5/2002 | Chou et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0133485 A1 | 9/2002 | Furuhashi |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 * | 6/2004 | Ko et al. ................... 369/47.14 |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |

| | | | | | | |
|---|---|---|---|---|---|---|
| 2005/0047294 A1 | 3/2005 | Park | | JP | 10-050032 A | 2/1998 |
| 2005/0050402 A1 | 3/2005 | Koda et al. | | JP | 10-187356 A | 7/1998 |
| 2005/0052972 A1 | 3/2005 | Park | | JP | 10-187357 | 7/1998 |
| 2005/0052973 A1 | 3/2005 | Park | | JP | 10-187358 | 7/1998 |
| 2005/0055500 A1 | 3/2005 | Park | | JP | 10-187359 | 7/1998 |
| 2005/0060489 A1 | 3/2005 | Park | | JP | 10-187360 | 7/1998 |
| 2005/0068877 A1 | 3/2005 | Yeo | | JP | 10-187361 A1 | 7/1998 |
| 2005/0083740 A1 | 4/2005 | Kobayashi | | JP | 11-110888 A | 4/1999 |
| 2005/0083767 A1 | 4/2005 | Terada et al. | | JP | 11-203792 A | 7/1999 |
| 2005/0083830 A1 | 4/2005 | Martens et al. | | JP | 2000-090588 A | 3/2000 |
| 2005/0195716 A1 | 9/2005 | Ko et al. | | JP | 2000-149449 A | 5/2000 |
| 2005/0207262 A1 | 9/2005 | Terada et al. | | JP | 2000-195178 A | 7/2000 |
| 2005/0289389 A1 | 12/2005 | Yamagami et al. | | JP | 2000-215612 | 8/2000 |
| 2006/0077827 A1 | 4/2006 | Takahashi | | JP | 2000-276838 A | 10/2000 |
| 2006/0195719 A1 | 8/2006 | Ueda et al. | | JP | 2000-285607 A | 10/2000 |
| 2006/0203635 A1 | 9/2006 | Ko et al. | | JP | 2000-293948 A | 10/2000 |
| 2006/0203638 A1 | 9/2006 | Ko et al. | | JP | 2001-023317 A | 1/2001 |
| 2006/0203684 A1 | 9/2006 | Ko et al. | | JP | 2001-069440 A | 3/2001 |
| 2006/0227694 A1 | 10/2006 | Woerlee et al. | | JP | 2001-110168 A | 4/2001 |
| 2007/0294571 A1 | 12/2007 | Park et al. | | JP | 2001-266464 A | 9/2001 |
| 2008/0046780 A1 | 2/2008 | Shibuya et al. | | JP | 2001-351334 A | 12/2001 |
| | | | | JP | 2001-357623 A | 12/2001 |

FOREIGN PATENT DOCUMENTS

| | | | | | |
|---|---|---|---|---|---|
| | | | JP | 2002-015507 A | 1/2002 |
| CN | 1140897 C | 1/1997 | JP | 2002-015525 A | 1/2002 |
| CN | 1227950 A | 9/1999 | JP | 2002-056619 A | 2/2002 |
| CN | 1273419 A | 11/2000 | JP | 2002-215612 A | 8/2002 |
| CN | 1675708 A | 9/2005 | JP | 2002-245723 A | 8/2002 |
| CN | 1685426 A | 10/2005 | JP | 2002-288938 A | 10/2002 |
| DE | 19954054 | 6/2000 | JP | 2002-329321 A | 11/2002 |
| EP | 0314186 A2 | 5/1989 | JP | 2002-352522 A | 12/2002 |
| EP | 0325823 | 8/1989 | JP | 2003-505813 A | 2/2003 |
| EP | 0350920 A3 | 1/1990 | JP | 2003-536194 A | 12/2003 |
| EP | 0464811 A2 | 1/1992 | JP | 2004-014088 A | 1/2004 |
| EP | 0472484 A2 | 2/1992 | JP | 2004-280864 A | 10/2004 |
| EP | 0477503 A2 | 4/1992 | JP | 2004-280865 A | 10/2004 |
| EP | 0556046 A1 | 8/1993 | JP | 2005-004912 A | 1/2005 |
| EP | 0871172 A2 | 10/1998 | JP | 2005-56542 A | 3/2005 |
| EP | 0908882 | 4/1999 | JP | 2005-535993 A | 11/2005 |
| EP | 0957477 A2 | 11/1999 | JP | 2005-538490 A | 12/2005 |
| EP | 0974967 A1 | 1/2000 | JP | 2005-538491 A | 12/2005 |
| EP | 0989554 A1 | 3/2000 | JP | 2006-503396 A | 1/2006 |
| EP | 0997904 A1 | 5/2000 | JP | 2006500707 T | 1/2006 |
| EP | 1026681 B1 | 8/2000 | JP | 2006-518533 A | 8/2006 |
| EP | 1043723 A1 | 10/2000 | JP | 2006-519445 A | 8/2006 |
| EP | 1132914 A2 | 9/2001 | JP | 2006-522991 | 10/2006 |
| EP | 1148493 | 10/2001 | KR | 10-2004-0023126 A | 3/2004 |
| EP | 1152402 A1 | 11/2001 | KR | 1020040094301 A | 11/2004 |
| EP | 1152414 A2 | 11/2001 | KR | 10-2005-0057396 A | 6/2005 |
| EP | 1239478 A1 | 9/2002 | RU | 2005 127 337 | 2/2006 |
| EP | 1274081 A2 | 1/2003 | TW | 371752 A | 10/1999 |
| EP | 1298659 A1 | 4/2003 | TW | 413805 | 12/2000 |
| EP | 1329888 A1 | 7/2003 | TW | 448435 B | 8/2001 |
| EP | 1347452 A2 | 9/2003 | TW | 470946 B | 1/2002 |
| EP | 1 547 066 A0 | 4/2004 | TW | 497098 B | 8/2002 |
| EP | 1547065 A0 | 6/2005 | WO | WO-84/00628 A1 | 2/1984 |
| EP | 1564740 A1 | 8/2005 | WO | WO-96/30902 A1 | 10/1996 |
| EP | 1573723 A0 | 9/2005 | WO | WO-97/22182 A1 | 6/1997 |
| EP | 1612790 A1 | 1/2006 | WO | WO-00/07185 A1 | 2/2000 |
| EP | 1623422 A0 | 2/2006 | WO | WO-00/54274 A1 | 9/2000 |
| GB | 2356735 A | 5/2001 | WO | WO-01/06512 A1 | 1/2001 |
| JP | 63-091842 A | 4/1988 | WO | WO-01/22416 A1 | 3/2001 |
| JP | 1-263955 A | 10/1989 | WO | WO-01/93035 A2 | 12/2001 |
| JP | 02-023417 A | 1/1990 | WO | WO-01/95330 A2 | 12/2001 |
| JP | 05-274814 A | 10/1993 | WO | WO-03/007296 A1 | 1/2003 |
| JP | 6-338139 A | 12/1994 | WO | WO-03/025924 A1 | 3/2003 |
| JP | 06-349201 A | 12/1994 | WO | WO-03/079353 A1 | 9/2003 |
| JP | 08-096522 A | 4/1996 | WO | WO-2004/015707 A1 | 2/2004 |
| JP | 8-273162 A | 10/1996 | WO | WO-2004/015708 A1 | 2/2004 |
| JP | 09-145634 A | 6/1997 | WO | WO-2004/025648 A1 | 3/2004 |
| JP | 09-231053 A | 9/1997 | WO | WO-2004/025649 | 3/2004 |
| JP | 9-270175 A | 10/1997 | WO | WO-2004/027775 A1 | 4/2004 |
| JP | 10-050005 A | 2/1998 | WO | WO-2004/029668 A2 | 4/2004 |
| | | | WO | WO-2004/029941 A1 | 4/2004 |

| | | |
|---|---|---|
| WO | WO-2004/029942 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/075180 A1 | 9/2004 |
| WO | WO-2004/079631 A2 | 9/2004 |
| WO | WO-2004/079729 A1 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/090890 | 10/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

OTHER PUBLICATIONS

ECMA: "ECMA 238 Data interchange on 130mm optical disk cartridges-WORM, using irreversible effects-capacity 2,6 Gbytes per cartridge"; ECMA-International. Org.; Jun. 1996; pp. 54-61; XP002289010.

* cited by examiner

BD-RE Single Layer

BD-RE Dual Layer

BD-WO Single Layer

L/R : Linear Replacement

WRITE-ONCE OPTICAL DISC, AND METHOD AND APPARATUS FOR ALLOCATING SPARE AREA ON WRITE-ONCE OPTICAL DISC

The present application is a continuation of application Ser. No. 10/670,462 filed on Sep. 26, 2003 now abandoned, the entire contents of which are herein fully incorporated by reference. The application claims the priority benefit of Korean Patent Application No. P2003-009895 filed on Feb. 17, 2003, and No. 2003-023870 filed on Apr. 16, 2003 in Republic Korea.

BACKGROUND OF THE INVENTION

1. Field of the Invention

The present invention relates to a write-once optical disc, and more particularly, to an apparatus and method for allocating a spare area on a write-once optical disc such as a write-once blu-ray disc.

2. Discussion of the Background Art

A new type of high density optical disc such as a Blu-ray Disc Rewritable (BD-RE) is being developed. A benefit of the BD-RE is that it has a rewritable capability where the quality video and audio data can be written, erased and rewritten thereon repeatedly.

FIG. 1 is a block diagram of a general optical disc device for writing/reproducing data to/from an optical disc such as a BD-RE. As shown in FIG. 1, the optical disc device includes an optical pickup 11 for recording/reproducing a signal to/from a BD-RE 10, a video disc recorder (VDR) system 12 for processing a signal from the optical pickup 11 as a reproduced signal, or demodulating and processing an external data stream into a writable signal suitable for writing onto the BD-RE 10, and an encoder 13 for encoding an external analog signal and providing the encoded signal to the VDR system 12.

FIG. 2 shows a structure of a general BD-RE. Referring to FIG. 2, an LIA (lead-in area), a data area and an LOA (lead-out area) are allocated on the BD-RE. An ISA (inner spare area) and an OSA (outer spare area) are allocated separately to a front and a rear end of the data area. A user data area having an LSN (Logical Sector Number) is allocated between the ISA and the OSA of the data area.

Referring to FIGS. 1 and 2, the VDR system 12 writes input data from an external source in a cluster unit corresponding ECC block having a predetermined recording capacity after encoding and converting the input data into a recording signal. The VDR system 12 also detects a defective area within the data area when recording the data.

When a defective area is detected, the VDR system 12 performs a replacement writing operation to write the cluster data from the defective area onto the ISA instead. After the data writing is finished, location information of the defective area and management information for reproducing the cluster data written on the spare area (replacement area) are written as a defect list onto the LIA.

FIGS. 3A and 3B illustrate a general structure of a BD-RE single layer and a BD-RE dual layer, respectively. As shown, a BD-RE may have a single recording layer (FIG. 3A) or two recording layers (FIG. 3B).

Referring to FIG. 3A, the recording capacity of the inner spare area ISA being allocated to the BD-RE single layer is 2048 clusters, and the recording capacity of the outer spare area OSA is N×256 (0=<N<=64) clusters with a maximum of 16384 clusters. The recording capacity of the data area of the BD-RE single layer is 355603 clusters. The recording capacity of the user data area of the BD-RE single layer is determined to be a difference between the recording capacity of the data area and the recording capacity of the spare areas. For example, when the recording capacity of the outer spare area is 16384 clusters (N=64), then the recording capacity of the user data area is 337171 clusters. As a result, the size of the inner and outer spare areas (18432=2048+16384) corresponds to 5.5% of the size of the user data area of the BD-RE single layer.

Referring to FIG. 3B, in the BD-RE dual layer, the recording capacity of the inner spare area (ISA0) of a first layer (Layer 0) is 2048 clusters. The recording capacity of the outer spare area (OSA0) of the first layer is N×256 clusters (0=<N<=32) with the 8192 maximum clusters (N=32). On the other hand, the recording capacity of the inner spare area (ISA1) of a second layer (Layer 1) is L×256 clusters (0=<L<=64) with the 16384 maximum clusters (L=64). The recording capacity of the outer spare area (OSA1) of the second layer is N×256 clusters (0=<N<=32) with the 8192 maximum clusters (N=32). As a result, the total recording capacity of the spare areas of the first and second layers is calculated to be 5.1% of the total recording capacity of the user data areas of the first and second layers.

A Blu-ray Disc Write-Once (BD-WO) is another type of high density optical disc that is being developed where a high quality of data can be recorded and reproduced to and from the disc. As the name may suggest, data can be written only once on the BD-WO and is not rewritable on the BD-WO. But the BD-WO can be read repeatedly. As a result, the BD-WO is useful where the rewritability of data on a recording medium is not desired.

Recently, standardizing the size of the BD-WO is being considered. But allocating the spare areas of the BD-WO as in the BD-RE would cause a problem of wasting precious recording space due to the characteristics of the BD-WO. For instance, in the BD-RE the recording capacity of the spare areas should be allocated large enough since the BD-RE re-records data repeatedly and as a result many defective areas can surface. In contrast, BD-WO is able to write once and thus relatively less defective areas may be present. Therefore, it is not necessary and is wasteful to allocate the same amount of spare area of the BD-RE onto the BD-WO.

SUMMARY OF THE INVENTION

Accordingly, the present invention is directed to an apparatus and method for allocating a spare area of a write-once optical disc that substantially obviate one or more problems due to limitations and disadvantages of a related art.

An object of the present invention is to provide a write-once optical disc and a method and apparatus for optimally allocating the spare area on the write-once optical disc in consideration of the characteristics of the optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allocating a spare area on a recording medium of write-once type according to an aspect of the invention includes allocating a data area on the recording medium; and allocating a user data area and at least one spare area within the data area on the recording medium, the at least one spare area having a variable size, wherein a maximum recording capacity of the at least one spare area on the recording medium is less than a maximum recording capacity of at least one variable spare area on a rewritable type optical disc.

In accordance with another aspect of the invention, a method for allocating a spare area on a recording medium of write-once type, the recording medium including at least one recording layer, includes allocating a data area on the at least one recording layer of the recording medium; and allocating a user data area and at least one spare area within the data area on the recording medium, the at least one spare area having at least one replacement area, the at least one replacement area having a variable size and constituting a part of the at least one spare area or the entire at least one spare area, wherein a maximum ratio of a size of the at least one replacement area to a size of the user data area is less than about 5%.

In accordance with another aspect of the invention, an apparatus for allocating a spare area on a recording medium of write-once type, includes a combination of elements for allocating a data area on the recording medium and for allocating a user data area and at least one spare area within the data area on the recording medium, the at least one spare area having a variable size, wherein a maximum recording capacity of the at least one spare area on the recording medium is less than a maximum recording capacity of at least one variable spare area on a rewritable type optical disc.

In accordance with another aspect of the invention, an apparatus for allocating a spare area on a recording medium of write-once type, the recording medium including at least one recording layer, includes a combination of elements for allocating a data area on the at least one recording layer of the recording medium and for allocating a user data area and at least one spare area within the data area on the recording medium, the at least one spare area having at least one replacement area, the at least one replacement area having a variable size and constituting a part of the at least one spare area or the entire at least one spare area, wherein a maximum ratio of a size of the at least one replacement area to a size of the user data area is less than about 5%.

In accordance with an aspect of the invention, a recording medium of write-once type includes a data area allocated on the recording medium, the data area including a user data area and at least one spare area, the at least one spare area having a variable size, wherein a maximum recording capacity of the at least one spare area on the recording medium is less than a maximum recording capacity of at least one variable spare area on a rewritable type optical disc.

In accordance with another aspect of the invention, a recording medium of write-once type includes at least one recording layer; and a data area allocated on the at least one recording layer, the data area including a user data area and at least one spare area, the at least one spare area having at least one replacement area, the at least one replacement area having a variable size and constituting a part of the at least one spare area or the entire at least one spare area, wherein a maximum ratio of a size of the at least one replacement area to a size of the user data area is less than about 5%.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the method of allocating a spare area on a write-once type optical disc such as BD-WO are explained in details according to the present invention in reference with drawings. The present method can be applied in the process of manufacturing a write-once BD-WO single layer and a write-once BD-WO dual layer. Considering the characteristics of data recording on the BD-WO, the maximum size of the spare area can be allocated which is smaller than the maximum size of the spare areas allocated to a BD-RE.

In the present invention, the recording capacity of the spare area(s)/replacement area(s) of a BD-WO is kept at less than about 5% of the recording capacity of the user data area. In the present application, the recording size of an area (assuming with no defects) means the size of the area. As such, these two terms are interchangeably used herein. As an example only, an embodiment of allocating the recording capacity of the spare area(s) to about 3% of the recording capacity of the user data area on the BD-WO will be now explained as follows.

Figure 1:
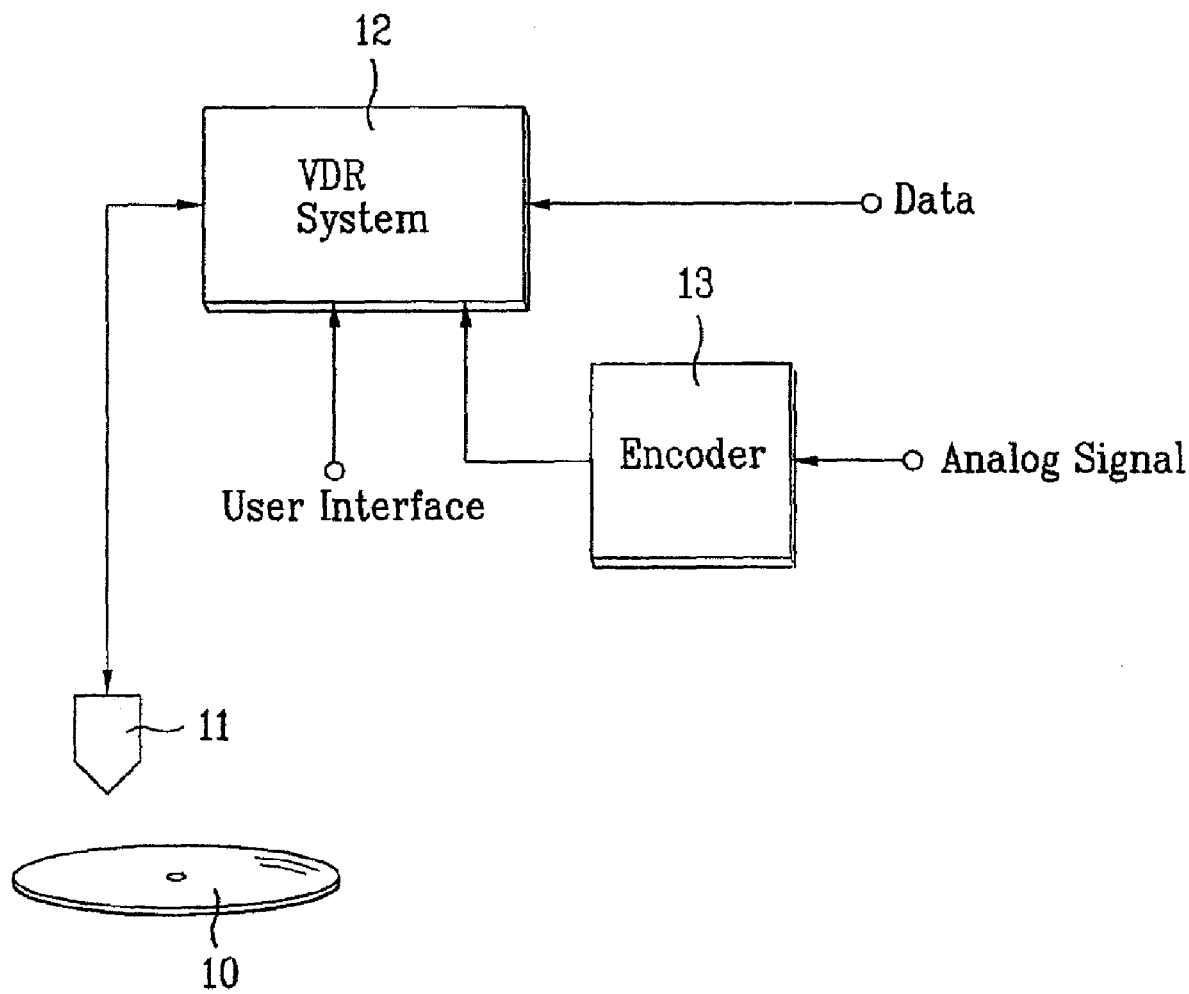
FIG. 1 illustrates a general optical disc device schematically.
Figure 2:
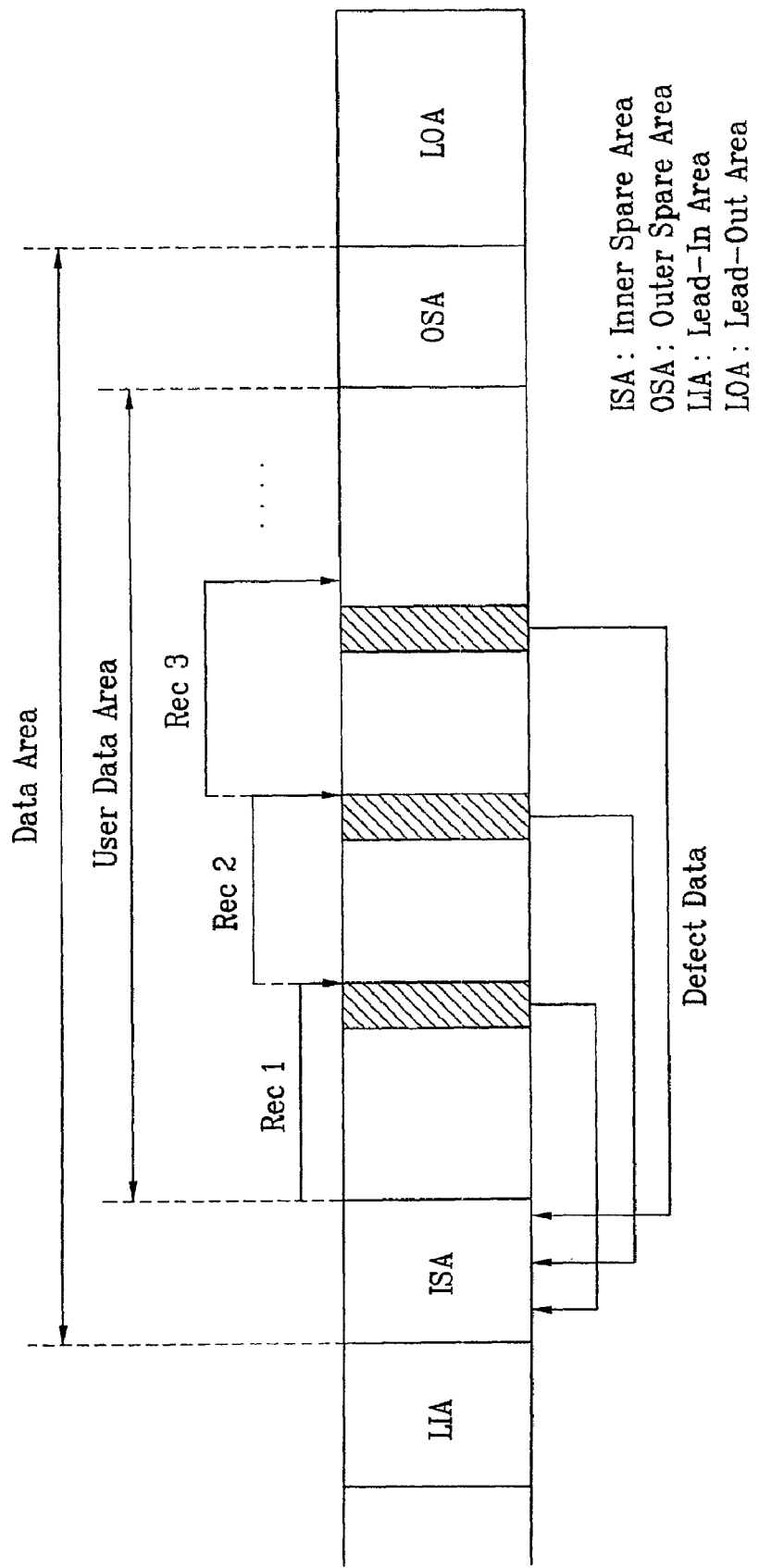
FIG. 2 illustrates a structure of a general BD-RE.
Figure 3A:
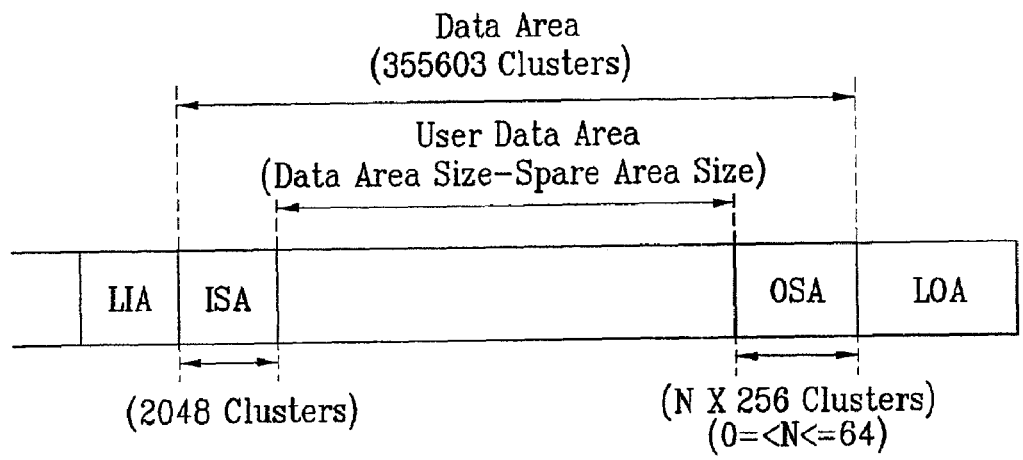
FIGS. 3A and 3B illustrate a structure of a BD-RE single layer and a general BD-RE dual layer, respectively.
Figure 3B:
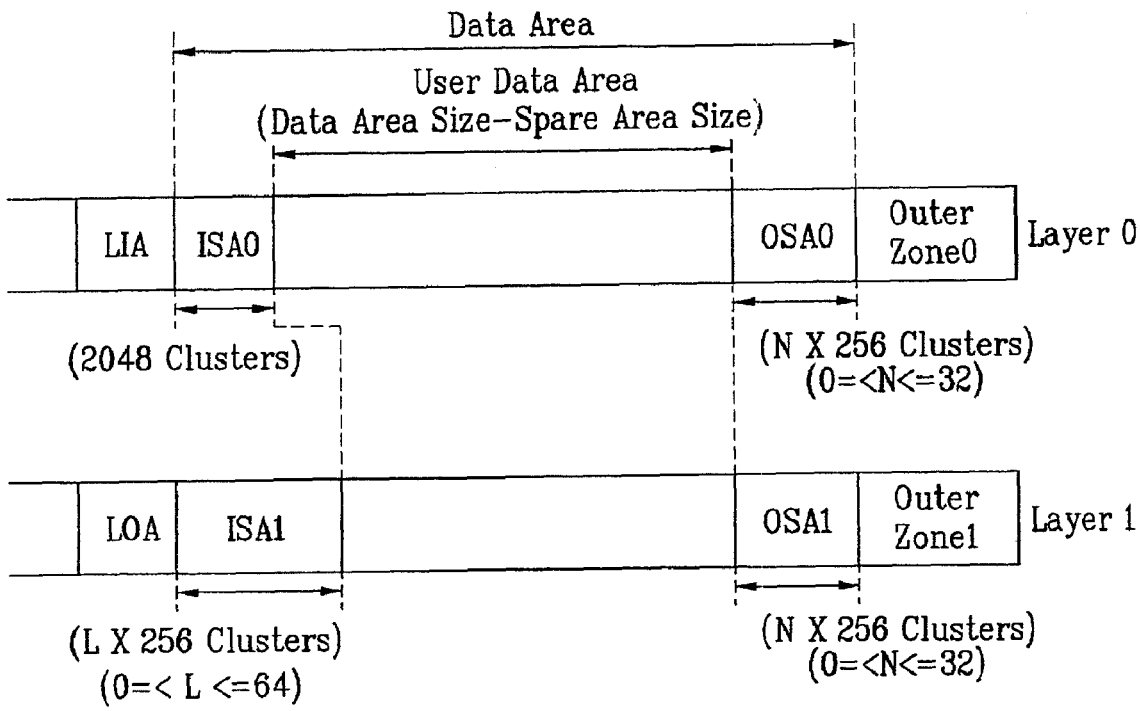
Figure 4:
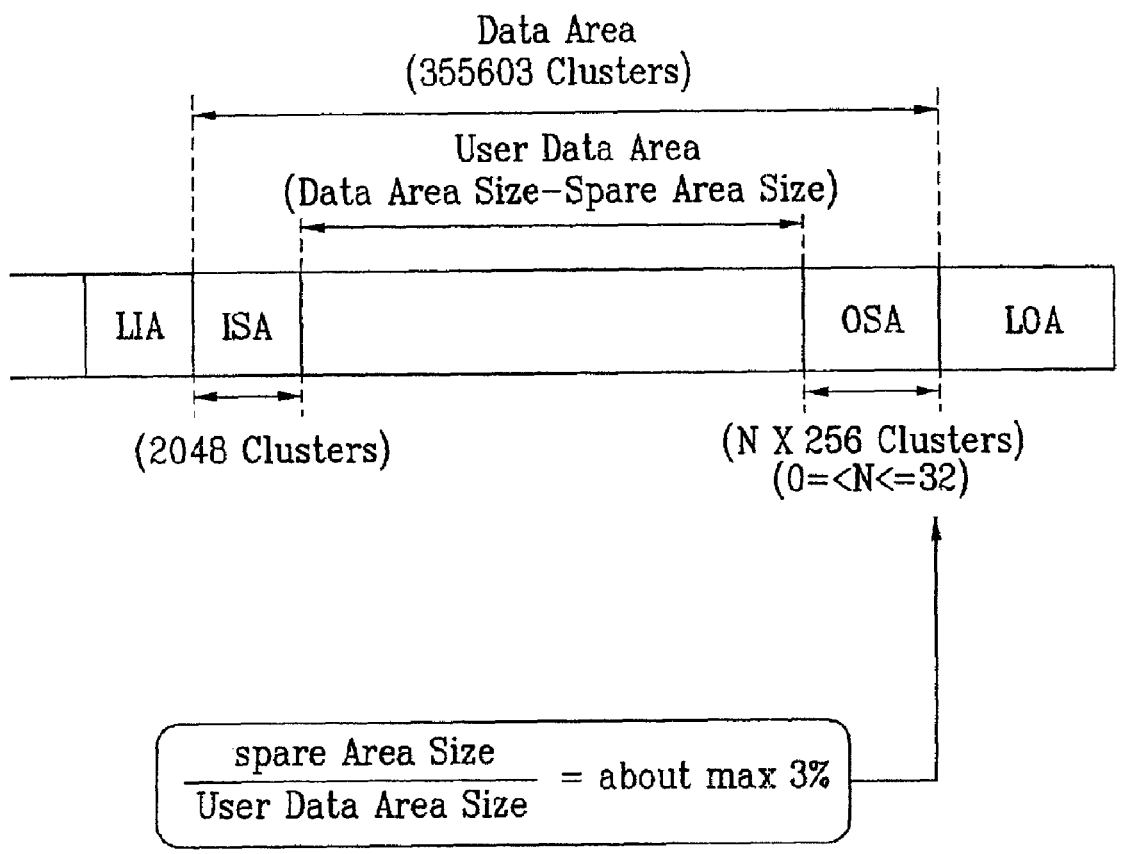
FIG. 4 illustrates a structure of a BD-WO single layer and a method of allocating a spare area on the BD-WO single layer according to a first preferred embodiment of the present invention.

FIG. 4 illustrates a structure of a BD-WO single layer and a method of allocating a spare area thereon according to a first embodiment of the present invention.

Referring to FIG. 4, the BD-WO single layer includes a single recording layer allocated with an LIA, a data area and an LOA. The data area includes a user data area having a logical sector number (LSN), and an inner spare area and/or an outer spare area for writing data of defective areas (i.e., as a replacement area). The recording capacity of the inner spare area (ISA) is allocated to be of a predetermined fixed value (e.g., 2048 clusters), and the recording capacity of the outer spare area (OSA) is variable, e.g., N×256 clusters (0=<N<=32) with the maximum 8192 clusters (N=32).

The recording capacity of the data area of the BD-WO single layer is allocated to have 355603 clusters. The recording capacity of the user data area is obtained by subtracting the recording capacity of the spare areas (ISA and OSA) from the recording capacity of the data area. For example, when the recording capacity of the outer spare area OSA is at the maximum 8192 clusters (N=32), the recording capacity of the user data area is calculated to be 34563 (=355603−(2048+8192)) clusters. As a result, the recording capacity of the inner and outer spare areas (10240=2048+8192) of the BD-WO single layer according to this embodiment is about 3% of the recording capacity (size) of the user data area (34563 clusters) of the BD-WO single layer.

Accordingly, when the recording capacity of the inner and outer spare areas allocated to the BD-WO single layer is adjusted to be about 3% of the recording capacity of the user data area by varying the maximum recording capacity of the outer spare area, the spare areas of the BD-WO are prevented from being wasted and are efficiently allocated.

Figure 5:
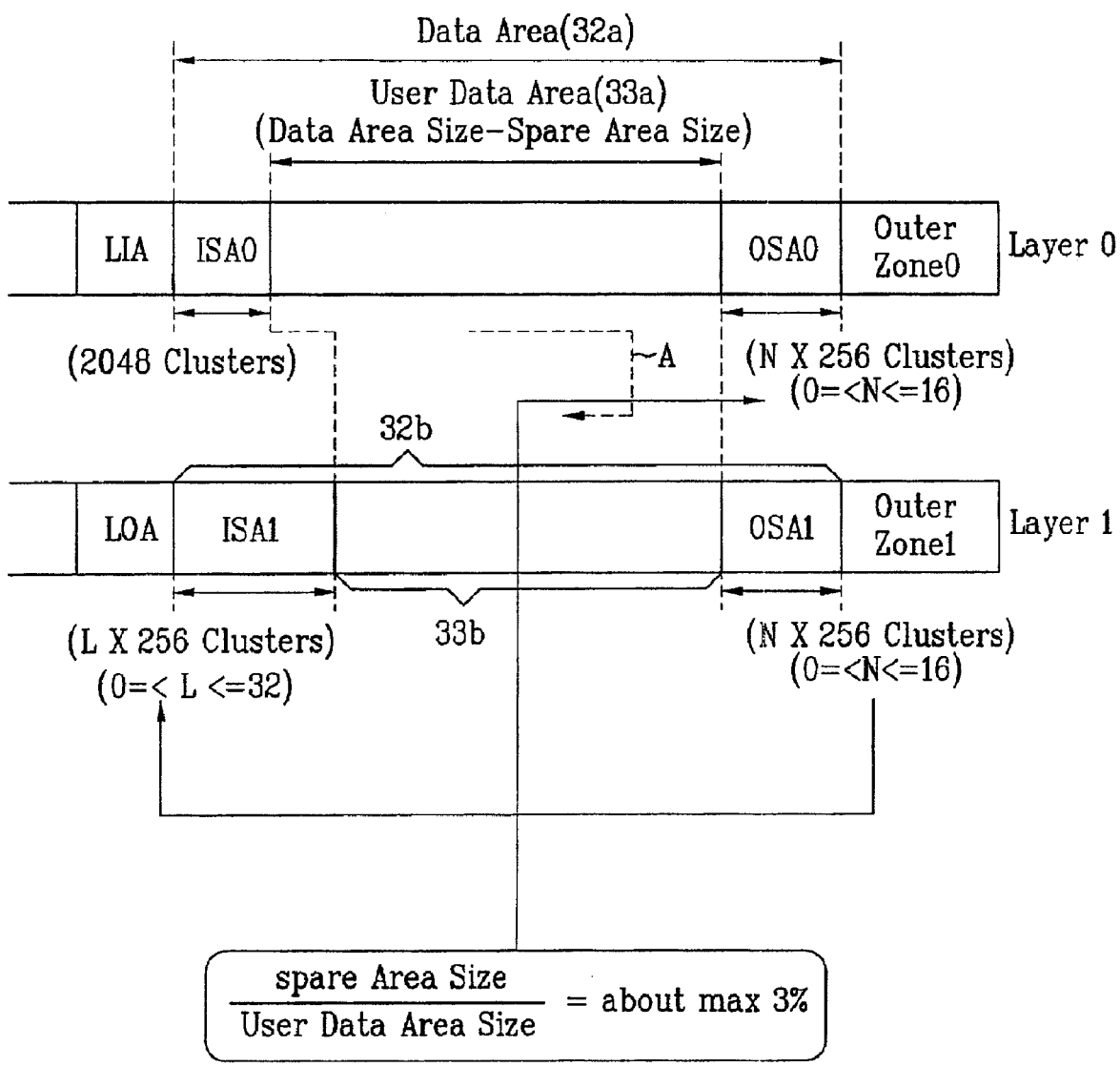
FIG. 5 illustrates a structure of a BD-WO dual layer and a method of allocating a spare area on the BD-WO dual layer according to the first preferred embodiment of the present invention.

FIG. 5 illustrates a structure of a BD-WO dual layer and a method of allocating a spare area thereon according to the first embodiment of the present invention.

Referring to FIG. 5, the BD-WO dual layer includes a first recording layer (Layer 0) and a second recording layer (Layer 1). The first recording layer (Layer 0) includes a LIA, a data area 32a, and an outer zone area (Outer Zone 0). The data area 32a includes an inner spare area (ISA0), a user data area 33a, and an outer spare area (OSA0). The second recording layer (Layer 1) includes a LOA, a data area 32b, and an outer zone area (Outer Zone 1). The data area 32b of the second layer includes an inner spare area (ISA1), a user data area 33b, and an outer spare area (OSA1). A data writing operation occurs generally in the direction shown with the dotted arrow A.

The inner spare area (ISA0) on the first layer has a predetermined fixed size, e.g., 2048 clusters. The recording capacity of the outer spare area (OSA0) on the first layer is variable and is N×256 clusters (0=<N<=16) with the maximum 4096 clusters (N=16). The recording capacity of the inner spare area (ISA1) on the second layer is variable and is L×256 clusters (0=<N<=16) with the maximum 8192 clusters (L=32). The recording capacity of the outer spare area (OSA1) on the second layer is variable and is N×256 clusters (0=<L<=32) with the maximum 4096 clusters (N=16). The total recording capacity of the first and second data areas 32a and 32b is 711206 (=355603×2) clusters.

The total recording capacity of the user data areas on the first and second layers is calculated by subtracting the total recording capacity of the spare areas from the total recording capacity of the data areas of the first and second layers. For example, if both recording capacities of the first and second outer areas (OSA0 and OSA1) are at maximum 4096 clusters (N=16) and the recording capacity of the inner spare area (OSA1) of the second layer is at maximum 8192 clusters (L=32), then the total recording capacity of the user data areas of the first and second layers becomes 692774 clusters (=(355603×2)−(2048+4096+4096+8192)). As a result, the total capacity of the spare areas of the first and second layers (2048+4096+4096+8192 clusters) corresponds to about 3% of the total recording capacity of the user data areas on the first and second layers.

Accordingly, the total recording capacity of the first and second inner and outer spare areas allocated to the BD-WO dual layer becomes about 3% of the total recording capacity of the user data areas by adjusting the maximum recording capacity of the first and second outer spare areas (OSA0, OSA1) and the maximum recording capacity of the second inner spare area (ISA1). Therefore, the spare areas are prevented from being wasted and are efficiently allocated in accordance with the data recording characteristics of the BD-WO.

In the first embodiment as shown in FIGS. 4 and 5, the entire spare areas (e.g., inner spare areas and outer spare areas) are used as replacement areas for storing data of defective areas according to a linear replacement scheme. For instance, if a cluster area of a user data area is found to be defective, then the data stored in that defective cluster area is also written onto a spare area functioning as a replacement area for the defective cluster area.

Figure 6:
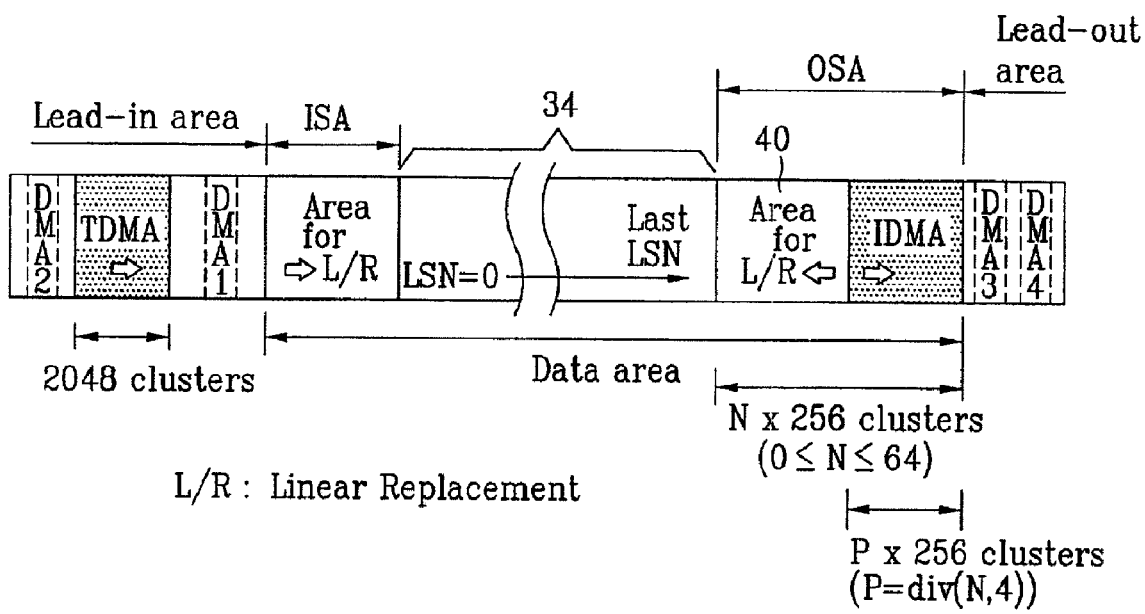
FIG. 6 illustrates a structure of a BD-WO single layer and a method of allocating a spare area on the BD-WO single layer according to a second preferred embodiment of the present invention.

FIG. 6 shows a structure a BD-WO single layer and a method for assigning a spare area on the BD-WO single layer according to a second embodiment of the present invention. The BD-WO single layer shown in FIG. 6 includes a lead-in area, a data area, and a lead-out area. The data area has a fixed size, e.g., 355603 clusters.

The lead-in area includes first and second defect management areas DMA1 and DMA2, and a temporary defect management area TDMA. TDMA is an area to temporarily record and manage defect management information of the BD-WO until the BD-WO is finalized. For instance, if during a writing operation of the user data area, if data in a defective cluster area of the user data area is written onto a part (replacement area) of a spare area according to a linear replacement scheme, then information (e.g., location information, size, etc.) of the defective cluster area and the corresponding replacement area within the spare area is temporarily stored in the TDMA as TDMA information. Then if the BD-WO is to be finalized (e.g., upon completion of the data writing onto the user data area), then the TDMA information stored in the TDMA is transferred to one or each of the DMAs allocated on the BD-WO. In this example, the TDMA provided in the lead-in area has a fixed size, for example, 2048 clusters.

The data area includes an inner spare area ISA, a user data area 34, and an outer spare area OSA. In this example, the entire inner spare area ISA is used as an area for linear replacement (i.e., as a replacement area). In other words, an area for temporary defect management is not allocated to the inner spare area ISA. Generally, the ISA has a fixed size (e.g., 2048 clusters) and the OSA has a variable size.

The outer spare area OSA includes an interim defect management area (IDMA) and a replacement area 40 for linear replacement. In one example, the IDMA is allocated adjacent to the replacement area 40. The size of the IDMA is allocated variably depending on the size of the outer spare area OSA. Since the outer spare area OSA has a variable size, the IDMA also has a variable size.

Here, the IDMA is distinguished from the TDMA having a fixed size in the lead-in area in that it has a variable size and may differ from the TDMA depending on a usage manner in recorded timing. However, the TDMA and the IDMA can store the same contents despite the difference between the terms. This will be described later.

In one example, the IDMA having a variable size is allocated within the outer spare area OSA depending on whether or not the outer spare area OSA is allocated. For instance, if the outer spare area OSA is allocated, then the IDMA is allocated therein as discussed herein. But if the outer spare area OSA is not allocated, then the IDMA may not be allocated and only the TDMA having a fixed size may be allocated as discussed herein. In another variation, the outer spare area OSA may be allocated without the allocation of the IDMA therein. However, if the outer spare area OSA is allocated, it is preferable to allocate the IDMA therein.

The size of the IDMA positioned at the outer track of the disc depends on the variable size of the outer spare area OSA. In one example, the size of the outer spare area OSA is N×256 clusters ($0 \leq N \leq 64$). In this case, the size of the IDMA can be P×256 clusters, where P is an integer determined to be P=N/4. That is, a method wherein the size of the IDMA is allocated to be a quarter of the size of the outer spare area OSA can be used in determining the size of the IDMA. For example, if N=64 is used, then the size of the outer spare area OSA is allocated to be 16384 clusters (16384=64×256) and P=N/4=16. As a result, the size of the IDMA according to the present invention is allocated to be 4096 clusters (4096=16×256).

Similarly, the size of the IDMA may be varied depending on the size of the outer spare area OSA considering that when the replacement area for linear replacement is allocated in the OSA, the size of the replacement area, the size of the DMA, and the size of the spare area(s) depend on one another. In contrast, the size of the disk inner track area (especially the size of the TDMA positioned in the lead-in area) has a fixed value.

Figure 7:
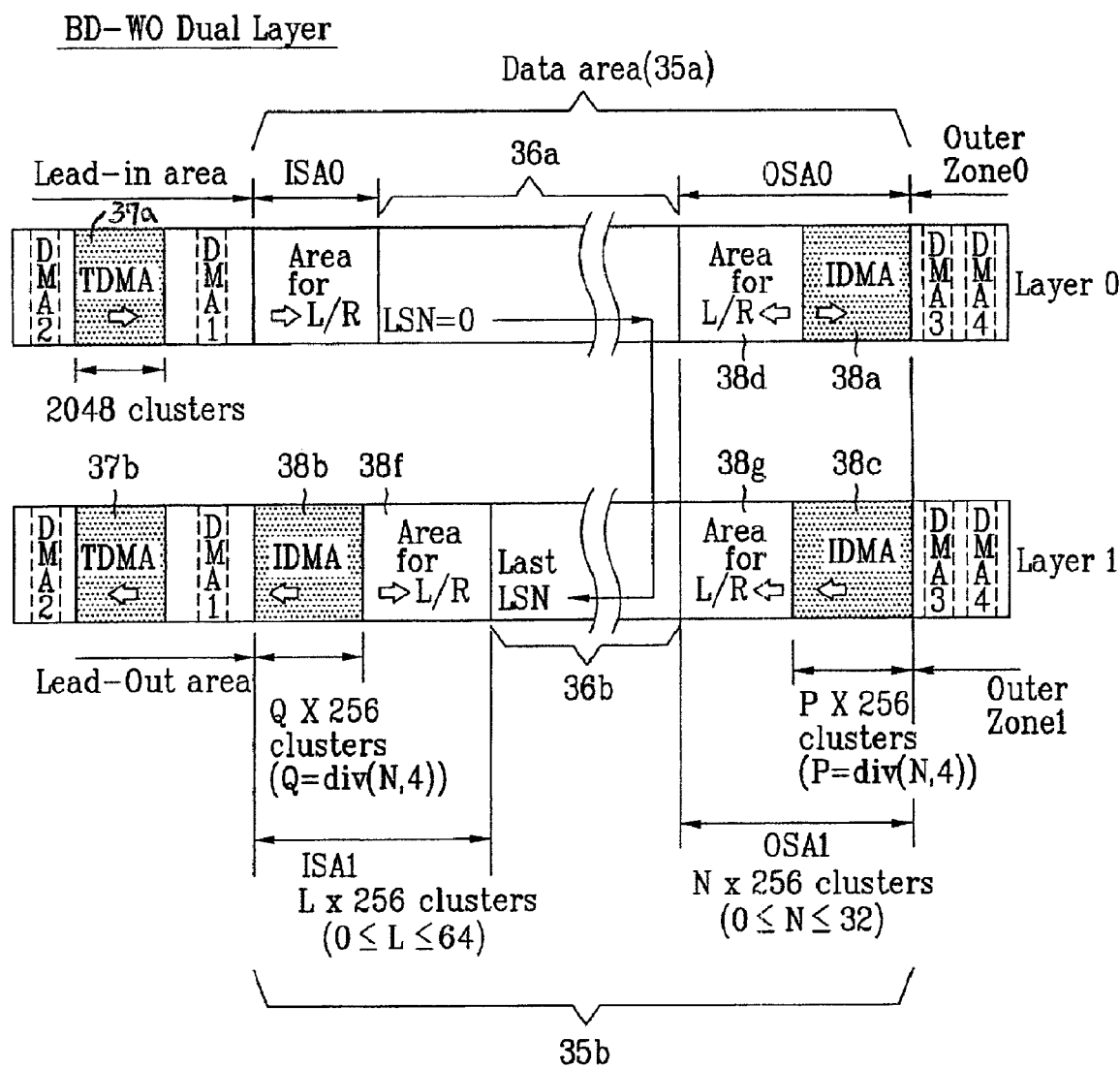
FIG. 7 illustrates a structure of a BD-WO dual layer and a method of allocating a spare area on the BD-WO dual layer according to the second preferred embodiment of the present invention.

FIG. 7 illustrates a structure of a BD-WO dual layer and a method of allocating a spare area on the BD-WO dual layer according to the second embodiment of the present invention.

Referring to FIG. 7, the BD-WO dual layer includes a first layer (Layer 0) and a second layer (Layer 1). The first layer (Layer 0) includes a lead-in area, a data area 35*a* and an outer zone area Outer Zone 0. The second layer (Layer 1) includes a lead-out area, a data area 35*b* and an outer zone area Outer Zone 1.

In each of the lead-in area and lead-out area, a TDMA of the present invention is provided as first and second TDMAs 37*a* and 37*b*, and a plurality of DMAs are provided. A plurality of DMAs are also provided in each of the Outer Zones 0 and 1. Each TDMA provided in the lead-in area and the lead-out area has a fixed size, for example, 2048 clusters.

The first data area 35*a* of the first layer (Layer 0) includes an inner spare area ISA0, a user data area 36*a*, and an outer spare area OSA0. The inner spare area ISA0 has a fixed size (e.g., 2048 clusters) and the outer spare area OSA0 has a variable size. Here, the entire ISA0 is used as a replacement area for linear replacement. The OSA0 includes a replacement area 38*d* for linear replacement and a first IDMA 38*a* for storing therein IDMA information for defect management. That is, an area for temporary defect management is not allocated to the inner spare area ISA0 of the first layer (Layer 0).

The second data area 35*b* of the second layer (Layer 1) includes an inner spare area ISA1, a user data area 36*b*, and an outer spare area OSA1. Each of the inner and outer spare areas ISA1 and OSA1 has a variable size. Each of the inner and outer spare areas ISA1 and OSA1 includes a replacement area 38*f* or 38*g* for linear replacement and an IDMA 38*b* or 38*c* for storing therein IDMA information for defect management. In one example, the IDMAs 38*a*-38*c* are each allocated to a portion adjacent to the corresponding replacement area for linear replacement. The size of the IDMAs is allocated depending on the size of the spare areas ISA1, OSA0 and OSA1 where the spare areas ISA1, OSA0 and OSA1 have a variable size.

Here, the IDMAs 38*a*-38*c* are allocated within the spare areas depending on whether or not the corresponding spare areas area allocated. For instance, if a spare area is allocated to the BD-WO, then the corresponding IDMA may be allocated therein. But if a spare area is not allocated, then the corresponding IDMA may not be allocated therein and only the TDMA(s) having a fixed size may be allocated. In one example, if the BD-WO has been allocated with the ISA0 and not with the ISA1, the OSA0 and/or the OSA1, then only the first TDMA 37*a* may be allocated and the second TDMA 37*b* and the IDMAs 38*a*-38*c* may not be allocated to the BD-WO. In another example, if the ISA0 and ISA1 (and not the OSA0 and OSA1) are allocated to the BD-WO, then the TDMAs 37*a* and 37*b* and the IDMA 38*b* (not the IDMAs 38*a* and 38*c*) may be allocated. In still another example, the IDMA may not be allocated within the corresponding spare area even if the corresponding spare area is allocated to the BD-WO. For instance, even if the ISA0, OSA0 and OSA1 are allocated to the BD-WO, the corresponding IDMAs 38*a* and 38*c* may not be allocated therein. It should be noted that one or more of the ISA0, the OSA0 (with or without the IDMA 38*a*), the OSA1 (with or without the IDMA 38*c*), and the ISA1 (with or without the IDMA 38*b*) may be allocated to the BD-WO with one or more of the TDMAs.

The size of the IDMAs may depend on the size of the spare areas ISA1, OSA0 and OSA1. For example, the size of each of the outer spare areas OSA0 and OSA1 is allocated to be N×256 clusters ($0 \leq N \leq 32$), and the size of the inner spare area ISA1 is allocated to be L×256 clusters ($0 \leq L \leq 64$). Then the size of each of the IDMAs 38*a* and 38*c* is allocated to be P×256 clusters and the size of the IDMA 38*b* is allocated to be Q×256 clusters, where P and Q are integers determined to be P=N/4 and Q=L/4. Here a method wherein the size of the IDMA having a variable size is allocated to be a quarter of the size of the corresponding outer/inner spare area can be used.

As an example, if N=32 (max), then the size of the outer spare areas OSA0 and OSA1 in total is 16384 clusters and P=N/4=8. As a result, the size of the IDMAs 38*a* and 38*c* in total is 4096 clusters. And if L=64 (max), the size of the inner spare area ISA1 is 16384 clusters and Q=L/4=16. As a result, the size of the IDMA 38*b* is allocated to be 4096 clusters. According to this example, the total maximum size of the data areas (35*a* and 35*b*) of the BD-WO dual layer is 711206 clusters, the total maximum size of the spare areas (ISA 0, ISA1, OSA0 and OSA1) of the BD-WO dual layer is 34816 clusters, the total maximum size of the IDMAs (38*a*-38*c*) is 8192 clusters, the total maximum size of the replacement areas (ISA0, 38*d*, 38*f* and 38*g*) within the spare areas is 26624 clusters, and the total size of the user data areas (36*a* and 36*b*) is 676390 clusters. As a result, the total capacity (size) of the replacement areas (ISA0, 38*d*, 38*f* and 38*g*) in the spare areas of the BD-WO dual layer corresponds to about 4% of the total recording capacity of the user data areas of the BD-WO dual layer.

Here, the size of the IDMAs may vary depending on the size of the spare areas ISA1, OSA0 and OSA1 considering that when a replacement area for linear replacement is allocated in the corresponding spare area, the size of the replacement area, the size of the IDMA(s) and the size of the spare area depend on one another. In contrast, the size of the inner track area (especially the TDMA positioned at each of the lead-in area and the lead-out area) has a fixed value.

The arrows depicted in each of the areas shown in FIGS. 6 and 7 are examples of a data recording direction.

According to the second embodiment as shown in FIGS. 6 and 7, if a defective area within the user data area is detected during a data writing operation of the BD-WO, the data written or to be written to the defective area is written to a replacement area of a spare area according to the linear replacement. Information pertaining to the defective area and the replacement area and any other information is written onto the TDMA(s) and IDMA(s) allocated on specific areas of the disc. The same defect management information may be written to each of the TDMA(s) and IDMA(s). In the alternative, if the TDMA of a layer is full, then the IDMA(s) of the same or different layer may be used, or if an IDMA of a layer is full, then the IDMA(s) of the same or different layer or the TDMA(s) of the same or different layer may be used.

According to the second embodiment, in the BD-WO single layer, the entire ISA may be used as the area for linear replacement, whereas a portion of the OSA may be used as the IDMA and the remaining portion (or another portion) of the OSA may be used as the area for linear replacement. In the BD-WO dual layer, the entire ISA0 may be used as the area for linear replacement, whereas portions of the ISA1, OSA0 and OSA1 may be used as the IDMA(s) and the remaining portions (or other portions) of the ISA1, OSA0 and OSA1 may be used as the area for linear replacement.

Figure 8:
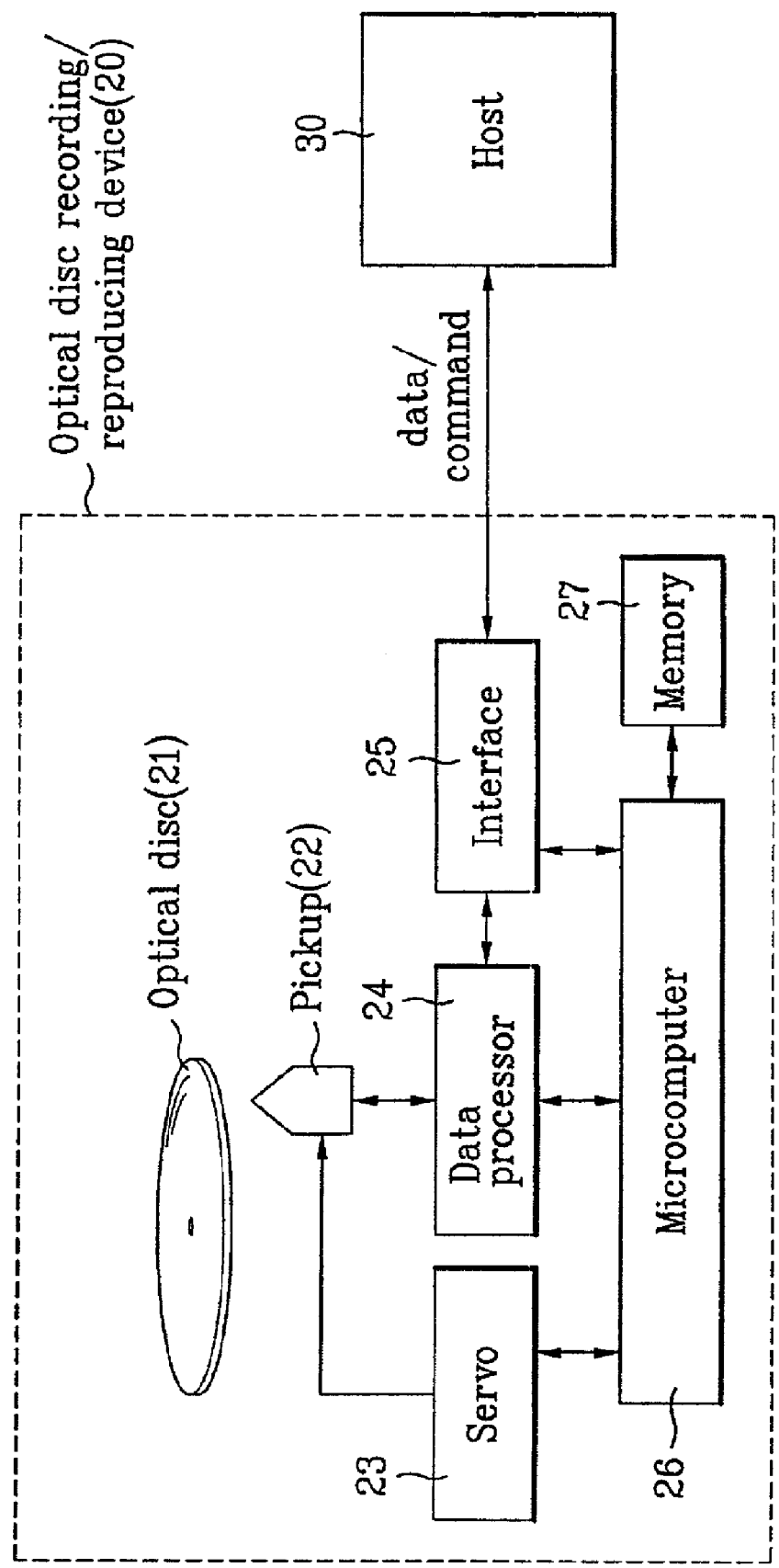
FIG. 8 is a block diagram of an optical disc recording/reproducing device according to an embodiment of the present invention.

FIG. 8 is an example of a block diagram of an optical disc recording/reproducing device 20 according to an embodiment of the present invention. The optical disc recording/reproducing device 20 includes an optical pickup 22 for writing/reading data to/from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data (e.g., TDMA information, IDMA information, DMA information, etc.) associated with the recording medium 21, and a microprocessor or controller 26 for controlling the operations and elements of the recording/reproducing device 20. Data to be written/read to/from the recording medium 21 may also be stored in the memory 27. All the components of the recording/reproducing device 20 are operatively coupled. The recording medium 21 is a recording medium of write-once type such as a BD-WO.

The methods of allocating spare areas, IDMA(s) and TDMA(s) on the BD-WO according to the embodiments of the present invention can be implemented by the recording/reproducing device 20 of FIG. 8 or any other suitable device/system. For instance, the microcomputer 26 can control allocating the size of the spare area(s), the IDMA(s), TDMA(s), etc. according to the above discussed embodiments. It can control varying the size of the spare area(s) as replacement writing operations are performed. It can control the process of writing replacement data to replacement areas of the spare areas in a replacement writing operation, and the process of writing defect management information to the IDMA(s), TDMA(s), and DMA(s). The process of allocating the spare area(s), IDMA(s), TDMA(s), etc. may occur as needed while the disc is being manufactured, or during or prior to data writing and/or replacement writing operations using the recording/reproducing device 20 or some other suitable device/system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for recording defect management information on a recording medium, the recording medium including an inner zone and a data area, the method comprising:

recording temporary defect management information into temporary management areas allocated to the inner zone and the data area until the recording medium is finalized, the temporary management areas being allocated to the inner zone and the data area when a plurality of the temporary management areas are provided, wherein the data area includes a spare area and a user data area, the spare area including a temporary management area for recording the temporary defect management information associated with a defective block, the spare area having a size of 0 to a predetermined maximum value, and wherein the inner zone includes a temporary management area allocated with a predetermined fixed size, and the temporary management area of the spare area is allocated with a size that is not predetermined; and recording the latest temporary defect management information included in the temporary management areas into a defect management area in the inner zone when the recording medium is to be finalized.

2. The method as claimed in claim 1, further comprising:

recording final defect management information into at least one management area allocated to the inner zone when the recording medium is finalized.

3. A recording medium, comprising:

an inner zone, a data area, temporary management areas storing temporary defect management information until the recording medium is finalized, which are allocated to the inner zone and the data area when a plurality of the temporary management areas are provided, wherein the data area includes a spare area and a user data area, the spare area including a temporary management area for recording the temporary defect management information associated with a defective block, the spare area having a size of 0 to a predetermined maximum value, and wherein the inner zone includes a temporary management area allocated with a predetermined fixed size, and the temporary management area of the spare area is allocated with a size that is not predetermined, and a defect management area, in the inner zone, for storing the latest temporary defect management information from the temporary management areas when the recording medium is finalized.

4. The recording medium as claimed in claim 3, further comprising:

at least one management area storing final defect management information when the recording medium is finalized, which is allocated to the inner zone.

5. A method for allocating an area to a recording medium of write-once type, the recording medium including an inner zone and a data area, the method comprising:

allocating, to the data area, at least one spare area with a size of 0 to a predetermined maximum value; and allocating, to the at least one spare area, at least one temporary defect management area for storing temporary defect management information associated with a defective block until the recording medium is finalized, wherein the temporary defect management area is allocated to the spare area when a plurality of the temporary defect management areas are provided, wherein the inner zone has a defect management area for storing defect management information when the recording medium is to be finalized, and wherein the inner zone includes the defect management area allocated with a predetermined fixed size, and the at least one temporary defect management area of the at least one spare area is allocated with a size that is not predetermined.

6. The method as claimed in claim 5, wherein if two spare areas are allocated to the data area, a ratio of a total size of the two spare areas to a size of a user data area within the data area is less than a predetermined value.

7. The method as claimed in claim 5, wherein a size of the temporary defect management area is variably allocated based on a size of the allocated spare area.

8. The method of claim 5, wherein the data area includes an inner spare area, a user data area and an outer spare area in order, and temporary defect management areas are allocated at an inner side of the inner spare area and an outer side of the outer spare area, respectively.

9. A recording medium, comprising:

a data area including a user data area and at least one spare area, the spare area including a temporary defect management area for storing temporary defect management information associated with a defective block, the spare area having a size of 0 to a predetermined maximum value, the temporary defect management area being allocated to the spare area when a plurality of the temporary defect management areas are provided; and an inner zone including a defect management area for storing defect management information when the recording medium is finalized, wherein the inner zone includes the defect management area allocated with a predetermined fixed size, and the temporary defect management area of the spare area is allocated with a size that is not predetermined.

10. The recording medium of claim 9, wherein if the data area includes two spare areas, a ratio of a total size of the two spare areas to a size of the user data area is less than a predetermined value.

11. The recording medium of claim 9, wherein the recording medium is of write-once type.

12. An apparatus for allocating an area to a recording medium including at least an inner zone and a data area, the apparatus comprising:

a pickup configured to record/reproduce data on/from the recording medium; and a controller operatively coupled to the pickup and configured to allocate at least one spare area to the data area, the spare area having a size of 0 to a predetermined maximum value, configured to allocate a temporary defect management area, to the spare area, for storing temporary defect management information until the recording medium is finalized, the temporary defect management area being allocated to the spare area when a plurality of temporary defect management areas are provided, and configured to control the pickup to store defect management information in a defect management area within the inner zone when the recording medium is to be finalized, wherein the inner zone includes the defect management area allocated with a predetermined fixed size, and the temporary defect management area of the spare area is allocated with a size that is not predetermined.

13. The apparatus of claim 12, wherein if the controller allocates two spare areas to the data area, a ratio of a total size of the two spare areas to a size of a user data area within the data area is less than a predetermined value.

14. An apparatus for recording defect management information on a recording medium, the recording medium including an inner zone and a data area, the apparatus comprising:

a pickup configured to record/reproduce data on/from the recording medium; and a controller operatively coupled to the pickup and configured to control the pickup to record temporary defect management information in temporary management areas allocated to the inner zone and the data area until the recording medium is finalized, the temporary management areas being allocated to the inner zone and the data area when a plurality of the temporary management areas are provided, wherein the data area includes a user data area and at least one spare area, the spare area including a temporary management area for recording the temporary defect management information associated with a defective block, and the spare area having a size of 0 to a predetermined maximum value, and wherein the inner zone includes a temporary management area allocated with a predetermined fixed size, and the temporary management area of the spare area is allocated with a size that is not predetermined, and the controller configured to control the pickup to record the latest temporary defect management information included in the temporary management areas into a defect management area in the inner zone when the recording medium is to be finalized.

15. The apparatus of claim 14, wherein the controller is further configured to control the pickup to record final defect management information in at least one management area within the inner zone when the recording medium is finalized.

* * * * *